April 6, 1965
P. TELL ETAL
3,177,286
CO-AXIAL CABLE WITH HELICAL INSULATION
Filed Sept. 18, 1962
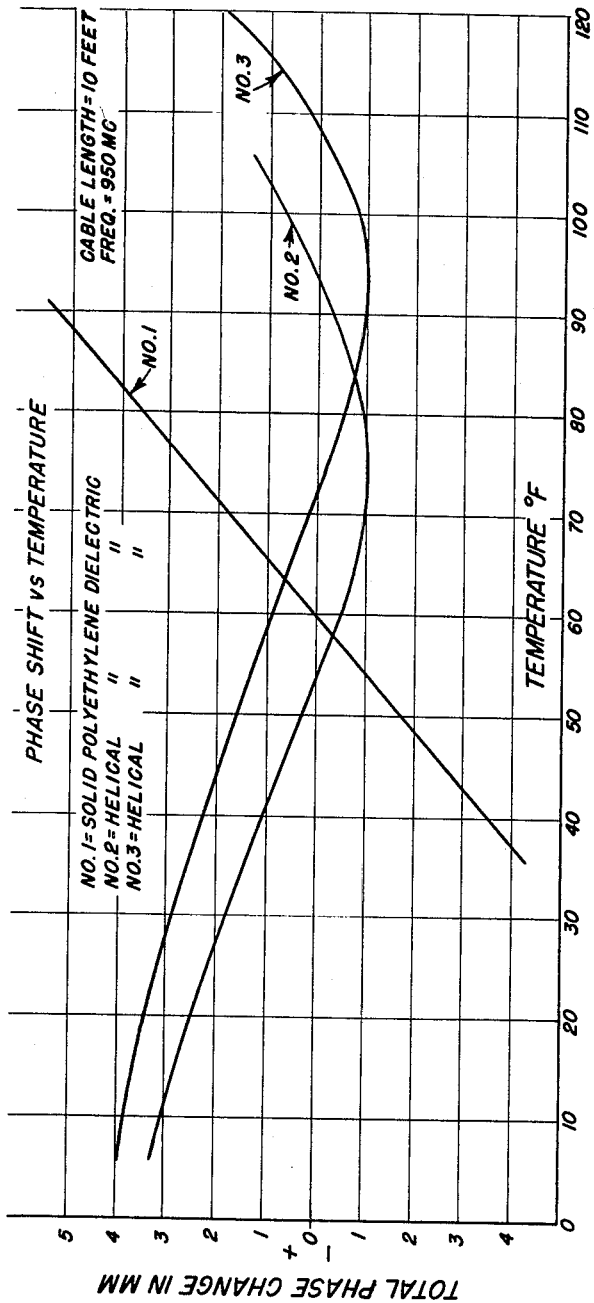
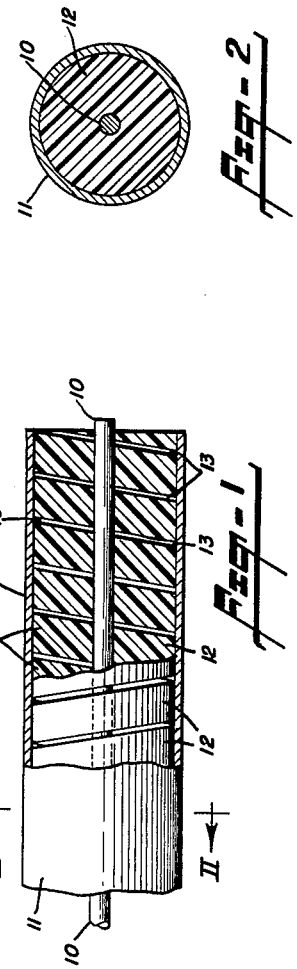
PHILIP TELL and
ALFRED J. HUBER
INVENTORS
BY
ATTORNEY

United States Patent Office

3,177,286
Patented Apr. 6, 1965

3,177,286
CO-AXIAL CABLE WITH HELICAL INSULATION
Philip Tell, Summit, and Alfred J. Huber, Elizabeth, N.J., assignors to Tellite Corporation, Orange, N.J., a corporation of Delaware
Filed Sept. 18, 1962, Ser. No. 224,473
3 Claims. (Cl. 174—102)

This invention relates to co-axial cables and more particularly to a co-axial cable of novel construction affording improved physical and electrical characteristics.

The method of making such cables now is described and claimed in our divisional application, Serial No. 397,832, filed September 21, 1964, and entitled "Method of Making Coaxial Cables."

Certain characteristics are essential in a co-axial cable designed for use in a radio frequency circuit, namely, a uniform dielectric constant and a low loss factor and, most importantly, phase stability (constant electrical length) under conditions of temperature variations and physical changes in the cable configuration between its terminal connectors. The last-mentioned two characteristics become increasingly important when the cable is to be incorporated in a circuit designed for operation in the ultra-high and super-high frequency spectrums.

Co-axial cables generally comprise a solid inner conductor centrally positioned within an outer tubular conductor with the space between the conductors filled with a suitable dielectric material in solid form. The phase shift of a co-axial cable is related to its length and velocity of wave propagation at a specific frequency. The velocity of propagation is determined by the dielectric constant while electrical length is a function of temperature. One dielectric material having good dielectric and loss factors is polytetrafluoroethylene, sold under the trademark Teflon. However, it has long been recognized that conventional cables incorporating this material suffer serious shortcomings. In particular, the axial expansion and contraction of the cable with temperature changes is appreciable. In the case of a cable of practical length, the change in the physical length of the cable changes its phase angle to such an extent that the use thereof is restricted to narrow temperature excursions and/or relatively low radio frequency circuits. Further, variations in the length of the cable often result in the development of permanent electrical discontinuities at the cable connectors. Still further, physical bending of a cable into a form different from a straight line results in a significant phase shift. The reason for this apparently lies in the stretching of the outer conductor at the bend thereby increasing the electrical length of the cable.

In the case of co-axial cables having a braided outer conductor, the outer conductor stretches and contracts to accommodate similar changes in the dielectric material, thereby alleviating, to a certain extent, the physical problems associated with present cables having a tubular outer conductor with a homogeneous solid wall. Braided cables, however, suffer from other limitations such as radiation, or leakage, through the braid.

A co-axial cable made in accordance with this invention overcomes the shortcomings of existing cables having a solid, tubular, outer conductor. Such cable has a minimum phase shift over a range of temperature variations far exceeding that specified for cables of this class. Also, the cable has an increased flexibility and the phase angle does not change appreciably even when the cable is bent at a relatively sharp angle. These highly desirable, practical features, which render the cable satisfactory for use in ultra-high frequency circuits, are obtained without sacrifice of other essential electrical characteristics.

An object of this invention is the provision of a co-axial cable having improved physical and electrical characteristics.

An object of this invention is the provision of a co-axial cable having dimensional and electrical stability over an extended range of temperature variations.

An object of this invention is the provision of a co-axial cable of the solid, outer conductor class, which cable has improved phase stability with temperature changes and with bending.

An object of this invention is the provision of a co-axial cable which can be made in a smaller size than conventional cables while retaining the same attenuation factor and without sacrifice of physical and electrical characteristics which are essential for the use of such cable in high frequency circuits and under varying operating conditions.

An object of this invention is the provision of a co-axial cable of the solid outer conductor class and wherein the dielectric material between the electrical conductors is in the form of a helix.

An object of this invention is the provision of a method for making a co-axial cable of superior electrical and physical characteristics.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

FIGURE 1 shows a co-axial cable made in accordance with this invention, with parts of the outer conductor broken away and certain parts in cross-section;

FIGURE 2 is a cross-sectional view taken along the line II—II of FIGURE 1; and

FIGURE 3 is a set of curves showing phase shift vs. temperature for ten foot lengths of the new cable.

Reference, now, is made to FIGURES 1 and 2 wherein the cable is shown as comprising an inner conductor 10 axially disposed within an outer, hollow conductor 11 of solid material. These conductors preferably are made of pure copper. The space between the two conductors is filled by the dielectric materials 12 having suitable dielectric and loss characteristics as required in high frequency techniques. Although any low loss plastic material, (having a dielectric constant suitable for the particular application) can be used to advantage when the cable is constructed and treated as described hereinbelow, the following description is specific to polyethylene. The dielectric constant of the cable depends upon the specific material used for the dielectric and, in this respect, polyethylene is well suited for the intended very high frequency applications.

In order to provide phase stability, the dielectric member 12 is in the form of a helix having minute spacings 13 between adjacent convolutions.

The method of making the cable is as follows: First, the center conductor 10 is selected of desired length and diameter. A tube of polyethylene is formed by a conventional extrusion process, such tube having an internal hole diameter about .001" greater than the outside diameter of the center conductor 10 and an outside diameter about .001" less than the internal diameter of a selected outer conductor 11. Such polyethylene tube is irradiated by exposure to high energy electrons, or gamma rays, produced either by isotope sources or electron accelerators. The irradiation treatment alters, by molecular cross-linking, the physical properties of the material, specifically, there is a transformation of properties from an easily fusible thermoplastic to a thermoset material. An irradiation dosage of 10 megarads is sufficient for polyethylene. By means of a suitable apparatus, such as a thread-cutting lathe, the tube wall is then cut completely through by a sharp tool having a minimum thickness. During such cutting of the tube wall, the tube is rotated and the cutting tool advanced at an appropriate feed rate to provide the desired width and pitch of the individual convolutions. In the case of relatively small diameter tubes, the described cutting operation can be performed on the tube without the use of a supporting mandrel. For larger diameter tubes, a mandrel is inserted through the tube to serve as a longitudinal support. Such mandrel also serves as a stop for the radial setting of the cutting tool, thereby assuring the complete and proper cutting of the tube wall. Upon completion of the described, spiral cutting operation, the now helical tube has an inherent springiness whereby the adjacent convolutions abut against each other. Preferably, the helical dielectric coil has a pitch equal to or less than the cable diameter.

The helical coil is now slidably inserted over the inner conductor (employing a relative turning, or threading, action, if necessary), with the coil convolutions, shown of generally parallelogram shape in cross-section, in abutting relation. Such sub-assembly then is slidably inserted through the outer tubular conductor, which procedure is facilitated by the difference between the outer diameter of the dielectric material tube and the inner diameter of the outer conductor. The assembled cable is then passed through a suitable die whereby the outer conductor is drawn down to proper size. Such drawing operation results in a slight radial compression of the dielectric material which results in a tight fit of the material between the two conductors and, at the same time, a slight progressive expansion of the material longitudinally of the cable. The latter action forces adjacent convolutions of the helix into tight abutting contact. To further enhance such initial squeezing together of adjacent convolutions, the cable can be rotated as it passes through the drawing die, such rotation being opposite to that of the pitch angle taken in a forward direction through the die. In any event, the cable, at this stage of manufacture, is the equivalent of a solid dielectric material cable. The loss factor is no greater than that of an equivalent volume of the same dielectric material. The dielectric constant is as uniform as available cable utilizing a solid dielectric material.

The cable is heated to an elevated temperture, say, about 120° F. When so heated, the difference between the expansion coefficients of copper and the dielectric material results in the ends of the helical coil protruding slightly beyond the outer conductor. The extent of such protrusion depends upon the cable length and diameter and the number of the helix convolutions per axial inch. In any event, after the cable is so heated, the protruding ends of the helix are cut off substantially flush with the other conductor. As the cable is permitted to cool to room temperature, the contraction of the helix results in the formation of the minute spacing 13 between adjacent convolutions. The length of such minute spacings, S taken axially of the cable, can be expressed as follows:

$$S = \frac{(\sigma_D - \sigma_C)(T_M - T_R)}{X}$$

where $\sigma_D$ is the coefficient of expansion of the dielectric,
$\sigma_C$ is the coefficient of expansion of copper,
$T_M$ is the elevated (treatment) temperature,
$T_R$ is normal ambient temperature, and
$X$ is the number of convolutions per inch.

The minute gap space formed between adjacent convolutions of the helix, when the dielectric is expanded by heat and then allowed to cool, is the compensating means that stabilizes the phase angle of the completed cable. Tests performed on cables of various lengths and diameters prove that the phase stability far exceeds that heretofore available in co-axial cables of this class, as long as the maximum temperature does not appreciably exceed the treatment temperature to which the cable was subjected during manufacture.

Reference, now, is made to the curves shown in FIGURE 3. Curve No. 1 shows the theoretical phase change, in millimeters, of a 10 foot cable having a braided outer conductor and a solid dielectric of polyethylene. Curves Nos. 2 and 3 show the measured, total phase change, in millimeters, of two cables made in accordance with this invention. Curve No. 2 was obtained with a cable having an outside diameter of .160″ and Curve No. 3 was obtained with a cable having an outside diameter of .250″. In order to establish the relationship between the initial heat treatment temperature of the cable and phase shift, the 160″ diameter cable was heat treated at a temperature of 105° F. whereas the .250″ diameter cable was heat treated at a temperature of 120° F. It is interesting to note that the maximum negative phase shift for each cable occurs at approximately 30 degrees below the heat treatment temperature. Also, whereas the normal phase shift for a conventional cable (one having a solid dielectric) varies linearly with temperature and becomes increasingly negative with decreasing temperature, the phase shift of the helical dielectric cable reverses sign and becomes positive at the lower temperatures. This is due to the gap spacings between adjacent convolutions, which spacings increase in width, minutely, as the temperature decreases, thereby effectively lengthening the line. The extended, useful temperature range of the new cable is obvious from the curves.

As an example, co-axial cables having a helical polyethylene dielectric, made and treated as herein-described, have a uniform dielectric constant of 2.32 and a low loss factor, which makes the new cables equivalent, in these respects, to the best available cables utilizing a solid dielectric. These factors, together with the extended operating range, temperature-wise, makes the cable particularly suited for use in delay lines wherein frequency changes with temperature cycling cannot be tolerated. In many applications, the cable is subjected to a low temperature in the region of −60° F. and then is expected to operate properly when brought back to room temperature. The new cable excells in this respect, by actual test. Again, this is due to the helical, spaced-gap form of the dielectric which prevents a shrinkage of the cable, at low temperature, to the point where the cable becomes electrically discontinuous relative to the electrical termination points. Further, a helical dielectric cable having a length of six feet and a diameter of .160″ showed no measurable phase change when bent at a 90 degree angle with a radius of curvature of .59″.

Having now described the construction of the cable and the method of making same, what we desire to protect by Letters Patent of the United States is set forth in the following claims.

We claim:

1. A co-axial cable comprising an inner conductor axially disposed within an outer conductor and a helical coil of solid dielectric material completely filling the space between the two conductors except for minute spacings between adjacent convolutions, said helical coil having a solid cross-section and being radially compressed between the two conductors.

2. The invention as recited in claim 1, wherein the dielectric material is polyethylene.

3. The invention as recited in claim 1, wherein the dielectric material is irradiated polyethylene.

(References on following page)

References Cited by the Examiner

UNITED STATES PATENTS

| | | | |
|---|---|---|---|
| 2,381,003 | 8/45 | Ryan | 174—29 |
| 2,461,834 | 2/49 | Morin | 174—29 |
| 2,580,838 | 1/52 | Rhodes | 174—29 |
| 2,697,867 | 12/54 | Arman | 29—155.5 |
| 2,869,220 | 1/59 | Raydt et. al. | 29—155.5 |
| 2,919,473 | 1/60 | Cole | 174—110 |
| 2,965,759 | 12/60 | Eberline | 174—29 X |
| 2,998,472 | 8/61 | Bondon | 174—28 |

FOREIGN PATENTS

| | | |
|---|---|---|
| 985,679 | 3/51 | France. |
| 1,064,665 | 12/53 | France. |

LARAMIE E. ASKIN, *Primary Examiner.*

JOHN P. WILDMAN, E. JAMES SAX, *Examiners.*